US012020656B2

(12) United States Patent
Hirose et al.

(10) Patent No.: US 12,020,656 B2
(45) Date of Patent: Jun. 25, 2024

(54) DISPLAY DEVICE

(71) Applicant: Japan Display Inc., Tokyo (JP)

(72) Inventors: Takaya Hirose, Tokyo (JP); Hirofumi Ohira, Tokyo (JP); Makoto Ishikawa, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 18/217,803

(22) Filed: Jul. 3, 2023

(65) Prior Publication Data

US 2024/0013737 A1 Jan. 11, 2024

(30) Foreign Application Priority Data

Jul. 8, 2022 (JP) ................................ 2022-110732

(51) Int. Cl.
*G09G 3/34* (2006.01)
*G09G 3/36* (2006.01)

(52) U.S. Cl.
CPC ......... *G09G 3/3426* (2013.01); *G09G 3/3648* (2013.01); *G09G 2300/023* (2013.01); *G09G 2320/0233* (2013.01); *G09G 2320/0276* (2013.01); *G09G 2320/0626* (2013.01); *G09G 2320/0686* (2013.01)

(58) Field of Classification Search
CPC ............... G09G 3/3426; G09G 3/3648; G09G 2300/023; G09G 2320/0233; G09G 2320/0276; G09G 2320/0626; G09G 2320/0686

See application file for complete search history.

(56) References Cited

U.S. PATENT DOCUMENTS 11,545,101 B2 * 1/2023 Tomizawa ........... G09G 3/3611
11,869,452 B2 * 1/2024 Goto .................... G09G 3/3426
2021/0142745 A1 5/2021 Kimura et al.

FOREIGN PATENT DOCUMENTS

WO 2019225137 A1 11/2019

* cited by examiner

*Primary Examiner* — Gene W Lee

(74) *Attorney, Agent, or Firm* — K&L Gates LLP

(57) ABSTRACT

According to an aspect, a display device includes: a display panel having a display area including pixels; a light source device configured to emit light from an emission area overlapping the display area toward the display panel; a dimming panel between the display panel and the light source device and configured to adjust brightness of emission light emitted from the emission area; and a drive circuit configured to drive the dimming panel. The emission area has a first emission area and a second emission area. The drive circuit is configured to, when gradation values of first pixels corresponding to the first emission area are equal to gradation values of second pixels corresponding to the second emission area, make transmittance of a second dimming area corresponding to the second pixels higher than that of a first dimming area corresponding to the first pixels in the dimming area.

6 Claims, 13 Drawing Sheets

FIG.12

| | | POINT α | POINT β | POINT γ |
|---|---|---|---|---|
| A | LUMINANCE OF EMISSION AREA | 100% | 50% | 25% |
| B | ADJUSTMENT DEGREE | 20% | 40% | 80% |
| C | HIGHEST GRADATION VALUE | 255 | 255 | 255 |
| D | GRADATION RATIO | 1 | 1 | 1 |
| E | TRANSMITTANCE | 20% | 40% | 80% |
| F | GRADATION VALUE OF DIMMING SUB-PIXEL | 25 | 51 | 204 |
| G | GRADATION VALUE OF DISPLAY SUB-PIXEL | 255 | 255 | 255 |
| H | LUMINANCE OF DISPLAY ARE | 51 | 51 | 51 |
| X | LUMINANCE OF DISPLAY AREA WHEN LUMINANCE ADJUSTMENT DATA IS NOT USED | 255 | 127 | 64 |

DISPLAY DEVICE

CROSS-REFERENCE TO RELATED APPLICATION

This application claims the benefit of priority from Japanese Patent Application No. 2022-110732 filed on Jul. 8, 2022, the entire contents of which are incorporated herein by reference.

BACKGROUND

1. Technical Field

What is disclosed herein relates to a display device.

2. Description of the Related Art

A configuration is known in which a dimming panel is provided between a liquid crystal display panel and a light source device to increase contrast of an image (for example, International Patent Application Publication No. WO2019/225137).

As in the case of the display device disclosed in International Patent Application Publication No. WO2019/225137, in an emission area of the light source device that emits light to the liquid crystal display panel, brightness may not be uniform due to the structure of the light source device. In this case, the brightness may not be uniform in a display area of the liquid crystal display panel displaying an image, even if all pixels have the same gradation value.

For the foregoing reasons, there is a need for a display device capable of making the brightness of a display area displaying an image uniform when gradation values of a plurality of pixels are the same as one another.

SUMMARY

According to an aspect, a display device includes: a display panel having a display area including a plurality of pixels; a light source device configured to emit light from an emission area overlapping the display area in plan view toward the display panel; a dimming panel disposed between the display panel and the light source device and configured to adjust brightness of emission light emitted from the emission area, in a dimming area overlapping the display area in plan view; and a drive circuit configured to drive the dimming panel. The emission area has a first emission area and a second emission area. The drive circuit is configured to, when gradation values of first pixels corresponding to the first emission area among the pixels are equal to gradation values of second pixels corresponding to the second emission area among the pixels, make transmittance of a second dimming area corresponding to the second pixels higher than that of a first dimming area corresponding to the first pixels in the dimming area.

BRIEF DESCRIPTION OF THE DRAWINGS

FIG. 12 is a table illustrating, for example, values calculated by the drive circuit when generating dimming sub-gradation data and display sub-gradation data;

DETAILED DESCRIPTION

Figure 1:
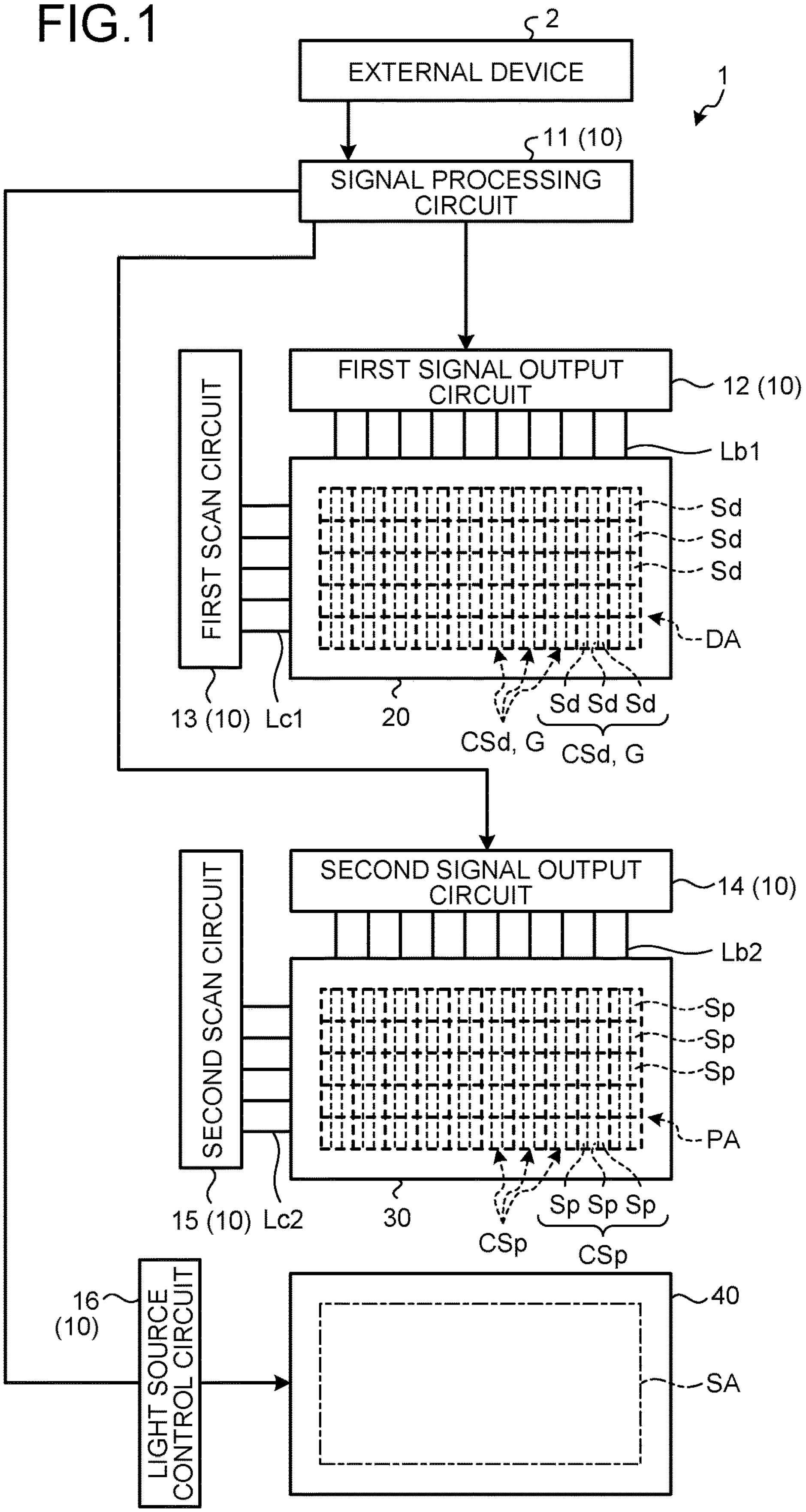
FIG. 1 is a diagram illustrating a configuration of a display device according to a first embodiment of the present disclosure.

The following describes embodiments of the present disclosure with reference to the drawings. The present disclosure is not limited to the description of the embodiments to be given below. Components to be described below include those easily conceivable by those skilled in the art or those substantially identical thereto. In addition, the components to be described below can be combined as appropriate.

What is disclosed herein is merely an example, and the present disclosure naturally encompasses appropriate modifications easily conceivable by those skilled in the art while maintaining the gist of the invention. To further clarify the description, the drawings schematically illustrate, for example, widths, thicknesses, and shapes of various parts as compared with actual aspects thereof, in some cases. However, they are merely examples, and interpretation of the present disclosure is not limited thereto. The same element as that illustrated in a drawing that has already been discussed is denoted by the same reference numeral through the description and the drawings, and detailed description thereof will not be repeated in some cases where appropriate.

An X-direction and a Y-direction illustrated in the drawings correspond to directions parallel to a principal surface of a substrate included in a display device 1. A +X side and a −X side of the X-direction and a +Y side and a −Y side of the Y-direction correspond to lateral sides of the display device 1. A Z-direction corresponds to a thickness direction of the display device 1. A +Z side of the Z-direction corresponds to a front surface side of the display device 1 on which images are displayed. A −Z side of the Z-direction corresponds to a back surface side of the display device 1. In the present specification, the term "plan view" refers to viewing the display device 1 from the +Z side toward the −Z side along the Z-direction. The X-, Y-, and Z-directions are examples, and the present disclosure is not limited to these directions.

In this disclosure, when an element is described as being "on" another element, the element can be directly on the other element, or there can be one or more elements between the element and the other element.

First Embodiment

Figure 2:
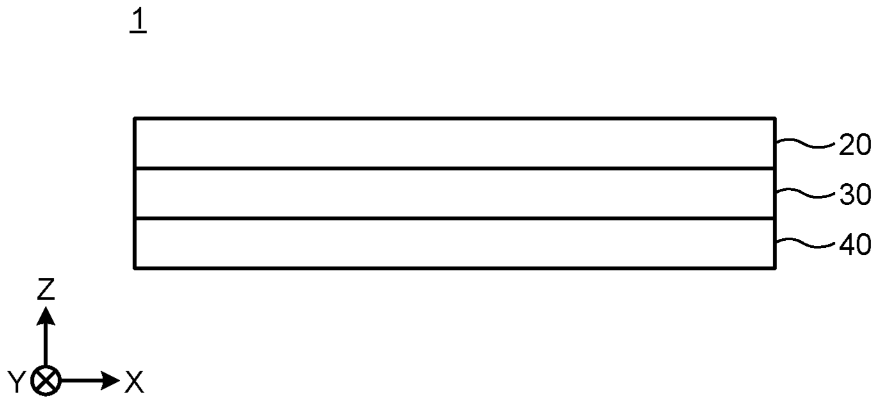
FIG. 2 is a side view of the display device.

FIG. 1 is a diagram illustrating a configuration of the display device 1 according to a first embodiment of the present disclosure. FIG. 2 is a side view of the display device 1. The display device 1 includes a drive circuit 10, a display panel 20, a light control panel (hereinafter, referred to as dimming panel) 30, and a light source device 40.

The drive circuit 10 acquires an image signal output from an external device 2 and controls the display panel 20, the dimming panel 30, and the light source device 40. The image signal is a signal having data for displaying an image on the display panel 20 (details will be described later).

The drive circuit 10 includes a signal processing circuit 11, a first signal output circuit 12, a first scan circuit 13, a second signal output circuit 14, a second scan circuit 15, and a light source control circuit 16.

The signal processing circuit 11 generates display sub-pixel signals, dimming sub-pixel signals, and light source control signals, which are to be described later, based on the image signal, and outputs the display sub-pixel signals, the dimming sub-pixel signals, and the light source control signals to the first signal output circuit 12, the second signal output circuit 14, and the light source control circuit 16, respectively. The signal processing circuit 11 also outputs clock signals for synchronizing the first signal output circuit 12, the first scan circuit 13, the second signal output circuit 14, the second scan circuit 15, and the light source control circuit 16 to the first signal output circuit 12, the first scan circuit 13, the second signal output circuit 14, the second scan circuit 15, and the light source control circuit 16, respectively.

The first signal output circuit 12 and the first scan circuit 13 control the display panel 20 based on the display sub-pixel signals. The second signal output circuit 14 and the second scan circuit 15 control the dimming panel 30 based on the dimming sub-pixel signals. The light source control circuit 16 controls the light source device 40 based on the light source control signals. The signal processing circuit 11, the first signal output circuit 12, the first scan circuit 13, the second signal output circuit 14, the second scan circuit 15, and the light source control circuit 16 will be described in detail later.

As illustrated in FIG. 2, the display panel 20, the dimming panel 30, and the light source device 40 are arranged in this order from the +Z side toward the −Z side. That is, the dimming panel 30 is disposed between the display panel 20 and the light source device 40 in the Z-direction.

The display panel 20 is a transmissive liquid crystal display. The display panel 20 may be, for example, an organic electroluminescent (EL) display or an inorganic EL display. As illustrated in FIG. 1, a front surface of the display panel 20 has a display area DA in which an image is displayed.

The display panel 20 includes a plurality of display sub-pixels Sd arranged in a matrix having a row-column configuration along the X- and Y-directions in the display area DA.

Figure 3:
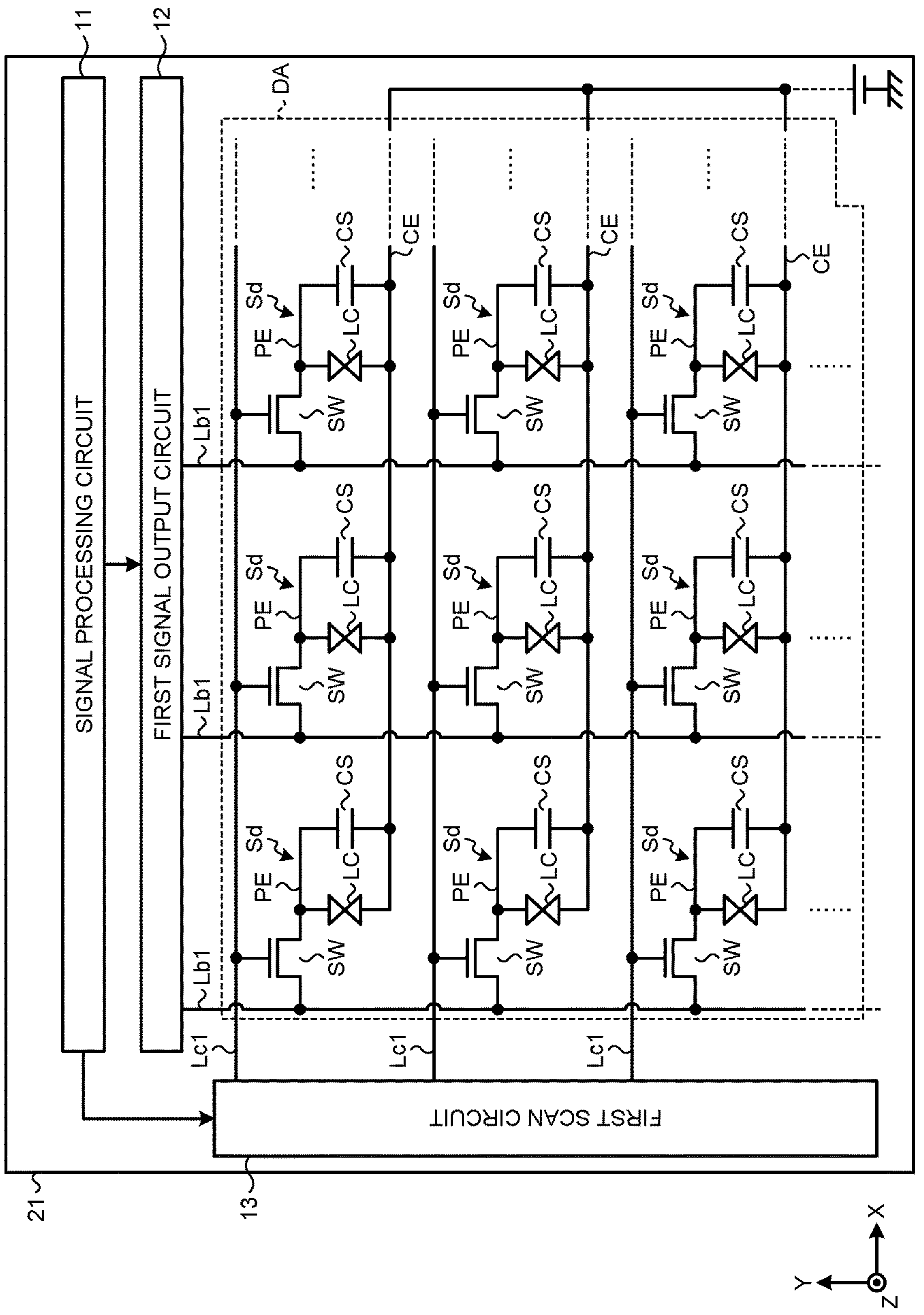
FIG. 3 is a diagram illustrating a circuit configuration of a display panel.

FIG. 3 is a diagram illustrating a circuit configuration of the display panel 20. The display sub-pixels Sd are driven by the first signal output circuit 12 and the first scan circuit 13.

The first signal output circuit 12 outputs the display sub-pixel signals to the display sub-pixels Sd (to be described in detail later). The first signal output circuit 12 is electrically coupled to the display sub-pixels Sd through a plurality of first signal lines Lb1 extending along the Y-direction.

The first scan circuit 13 scans the display sub-pixels Sd in synchronization with the output of the display sub-pixel signals by the first signal output circuit 12. The first scan circuit 13 is electrically coupled to the display sub-pixels Sd through a plurality of first scan lines Lc1 extending along the X-direction.

The display panel 20 includes a switching element SW, a sub-pixel electrode PE, a common electrode CE, liquid crystal capacitance LC, and holding capacitance CS that are included in each of the display sub-pixels Sd.

The switching element SW is formed of a thin-film transistor (TFT), for example. In the switching element SW, a source electrode is electrically coupled to a corresponding one of the first signal lines Lb1, and a gate electrode is electrically coupled to a corresponding one of the first scan lines Lc1.

The sub-pixel electrode PE is coupled to a drain electrode of the switching element SW. The common electrodes CE are arranged correspondingly to the first scan lines Lc1. The sub-pixel electrode PE and the common electrode CE have a light-transmitting property.

The liquid crystal capacitance LC is a capacitive component of liquid crystal material of a liquid crystal layer 22 (to be described later) provided between the sub-pixel electrode PE and the common electrode CE. The holding capacitance CS is provided between an electrode having the same potential as that of the common electrode CE and an electrode having the same potential as that of the sub-pixel electrode PE.

Figure 4:
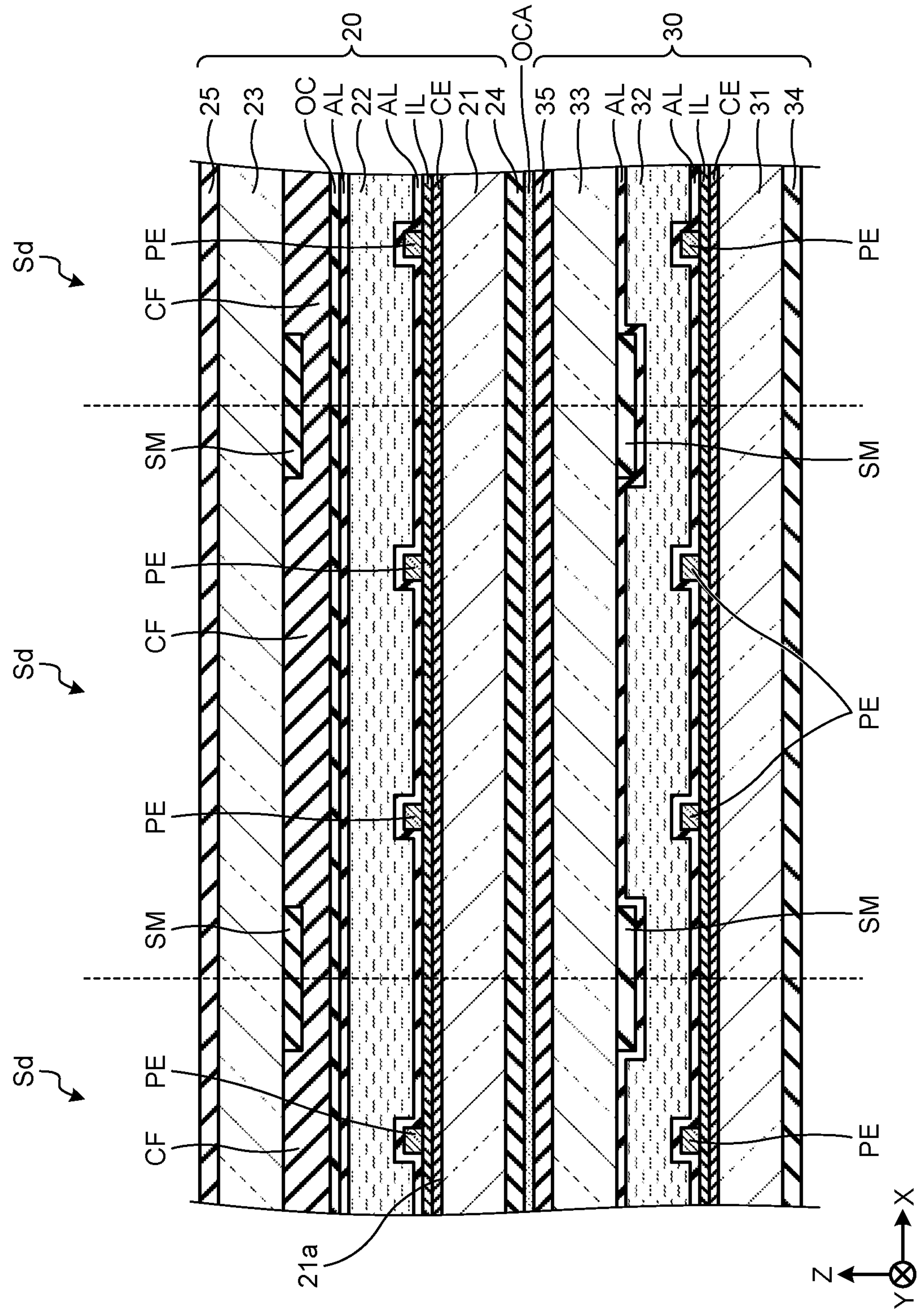
FIG. 4 is a sectional view of the display panel and a dimming panel.

FIG. 4 is a sectional view of the display panel 20 and the dimming panel 30. The display sub-pixels Sd of the display panel 20 further include a first substrate 21, the liquid crystal layer 22, and a second substrate 23. The first substrate 21, the liquid crystal layer 22, and the second substrate 23 each have a light-transmitting property and are arranged in this order from the −Z side toward the +Z side.

The first substrate 21 is rectangular in plan view and is provided one for the display sub-pixels Sd. The signal processing circuit 11, the first signal output circuit 12, and the first scan circuit 13 are arranged on the first substrate 21 (FIG. 3).

The switching element SW, the first signal line Lb1, and the first scan line Lc1 are arranged on a principal surface 21*a* on the +Z side of the first substrate 21 (not illustrated in FIG. 4). Furthermore, the common electrode CE and the sub-pixel electrode PE are arranged on the principal surface 21*a* with an insulating layer IL interposed therebetween. Thus, the sub-pixel electrode PE and the common electrode CE are arranged on the first substrate 21, and the display panel 20 is an in-plane switching liquid crystal display.

The liquid crystal layer 22 is formed including a plurality of liquid crystal molecules. The liquid crystal layer 22 is located between two orientation films AL in the Z-direction. The orientation of the liquid crystal molecules is regulated by the two orientation films AL.

The second substrate 23 is rectangular in plan view and is provided one for the display sub-pixels Sd. A color filter CF, a light-blocking layer SM, and an overcoat layer OC are arranged on a back surface side of the second substrate 23.

The color filter CF is rectangular in plan view and is arranged one for each of the display sub-pixels Sd. The color filter CF has a light-transmitting property, and the spectral peak of light to be transmitted therethrough is determined in advance.

This spectral peak is one of three spectral peaks corresponding to three colors different from one another. The three colors are red, green, and blue, and it is needless to say that the number and types of the colors are not limited to them. Hereafter, the color corresponding to the spectral peak of the light transmitted by the color filter CF is referred to as the color of the color filter CF. The color of the color filter CF corresponds to the color of the display sub-pixel Sd.

The first signal line Lb1 arranged on the first substrate 21 is located in a position overlapping the boundary of the color filters CF of two of the display sub-pixels Sd adjacent to each other in the X-direction in plan view. That is, the first signal line Lb1 is located in a position overlapping the boundary of the two display sub-pixels Sd adjacent to each other in the X-direction in plan view.

The first scan line Lc1 arranged on the first substrate 21 is located in a position overlapping the boundary of the color filters CF of two of the display sub-pixels Sd adjacent to each other in the Y-direction in plan view. That is, the first scan line Lc1 is located in a position overlapping the boundary of the two display sub-pixels Sd adjacent to each other in the Y-direction in plan view.

The light-blocking layer SM has a light-blocking property and demarcates the display sub-pixels Sd. That is, the light-blocking layer SM is located in a position overlapping the boundaries of the display sub-pixels Sd adjacent to one another in the X- and Y-directions. The light-blocking layer SM overlaps the first signal lines Lb1 and the first scan lines Lc1 in the Z-direction.

The overcoat layer OC is disposed between the color filters CF and one of the orientation films AL to restrain pigments contained in the color filters CF from penetrating into the liquid crystal layer 22.

The display panel 20 further includes a first polarizing plate 24 disposed on a back surface side of the first substrate 21 and a second polarizing plate 25 disposed on a front surface side of the second substrate 23.

The first polarizing plate 24 has a transmission axis orthogonal to the Z-direction. The second polarizing plate 25 has a transmission axis orthogonal to the transmission axis of the first polarizing plate 24 and the Z-direction.

Figure 5:
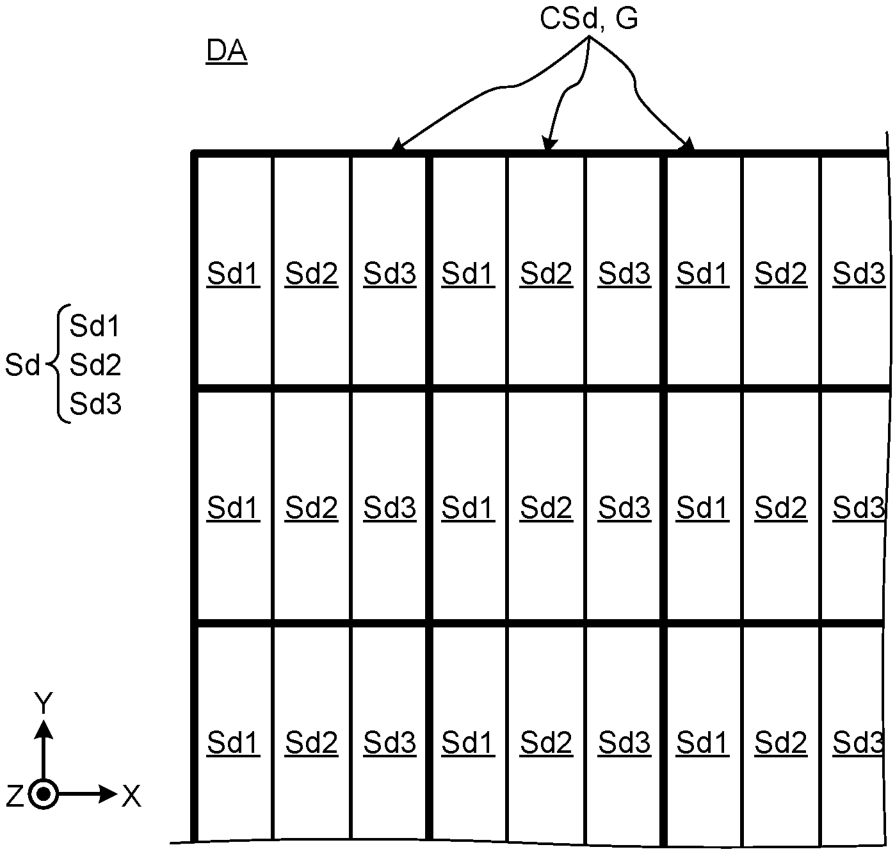
FIG. 5 is a plan view of a display area.

FIG. 5 is a plan view of the display area DA. The display sub-pixels Sd include a plurality of first display sub-pixels Sd1, a plurality of second display sub-pixels Sd2, and a plurality of third display sub-pixels Sd3. In the first display sub-pixel Sd1, the second display sub-pixel Sd2, and the third display sub-pixel Sd3, the colors of the color filters CF, that is, the colors of the display sub-pixels Sd, are different from one another. The color of the first display sub-pixels Sd1 is red. The color of the second display sub-pixels Sd2 is green. The color of the third display sub-pixels Sd3 is blue. It is needless to say that the colors of the display sub-pixels Sd are not limited to these colors. The color of the first display sub-pixel Sd1, the color of the second display sub-pixel Sd2, and the color of the third display sub-pixel Sd3 only need to differ from one another. When describing matters common to the first display sub-pixels Sd1, the second display sub-pixels Sd2, and the third display sub-pixels Sd3 without distinguishing them from one another, they may simply be called "display sub-pixels Sd".

In the display area DA, a column of the display sub-pixels Sd in which the first display sub-pixels Sd1 are arranged along the Y-direction, a column of the display sub-pixels Sd in which the second display sub-pixels Sd2 are arranged along the Y-direction, and a columns of the display sub-pixels Sd in which the third display sub-pixels Sd3 are arranged along the Y-direction, are repeatedly arranged in this order along the X-direction. That is, in the display area DA, a plurality of display sub-pixel sets CSd, each set including one of the first display sub-pixels Sd1, one of the second display sub-pixels Sd2, and one of the third display sub-pixels Sd3 arranged along the X-direction, are arranged along the X-direction and the Y-direction.

This display sub-pixel set CSd forms one pixel G. That is, the pixels G are arranged along the X- and Y-directions in the display area DA. In other words, the arrangement of the display sub-pixels Sd is what is called a stripe array in the display area DA. However, it is needless to say that the arrangement of the display sub-pixels Sd is not limited to the stripe array.

The following describes an operation of the display panel 20. First, a case will be described where the display panel 20 employs a normally black system, and a black color is displayed in the display area DA. In this case, the drive circuit 10 does not drive the display sub-pixels Sd, and no electric field is generated in the liquid crystal layer 22. Thus, the orientation of the liquid crystal molecules is regulated by the orientation films AL.

Light emitted from the light source device 40 is incident on the display panel 20 from a back surface side of the first polarizing plate 24 through the dimming panel 30. The light transmitted through the first polarizing plate 24 is linearly polarized light having a polarizing axis parallel to the transmission axis of the first polarizing plate 24. The light transmitted through the first polarizing plate 24 passes through the first substrate 21 and is incident on the liquid crystal layer 22.

When the orientation of the liquid crystal molecules is regulated by the orientation films AL, the polarizing axis of the light does not rotate in the liquid crystal layer 22. The light transmitted through the liquid crystal layer 22 passes through the second substrate 23 and is incident on the second polarizing plate 25.

The polarizing axis of the light transmitted through the liquid crystal layer 22 and the second substrate 23 are orthogonal to the transmission axis of the second polarizing plate 25, and the light transmitted through the liquid crystal layer 22 does not pass through the second polarizing plate 25. That is, when the orientation of the liquid crystal molecules is regulated by the orientation films AL, the light emitted from the light source device 40 does not pass through the display sub-pixels Sd. Thus, the display area DA displays the black color.

The following describes the operation of the display panel 20 when an image is displayed in the display area DA. In this case, the display sub-pixel signals are output from the first signal output circuit 12 to the display sub-pixels Sd. The display sub-pixel signals contain display sub-gradation data indicating the gradations of the display sub-pixels Sd.

The first scan circuit 13 scans the display sub-pixels Sd to operate the switching elements SW to transmit the display sub-pixel signals to the sub-pixel electrodes PE. This operation generates potential differences between the common electrode CE and the sub-pixel electrodes PE, and thus, generates an electric field in the liquid crystal layer 22 to change the orientation of the liquid crystal molecules. The orientation of the liquid crystal molecules depends on the display sub-gradation data. Specifically, the direction of the polarizing axis of the light transmitted through the liquid crystal layer 22 changes in accordance with the gradation values of the display sub-gradation data. A part of the light transmitted through the liquid crystal layer 22 that has a polarizing axis not orthogonal to the polarizing axis of the second polarizing plate 25 passes through the second polarizing plate 25.

The luminance of the light transmitted through the second polarizing plate 25 is luminance corresponding to the gradation values of the display sub-gradation data. Thus, the display sub-pixel signals adjust the orientation of the liquid crystal molecules, thereby, adjusting the transmittance of the liquid crystal layer 22, that is, the luminance of the light transmitted through the liquid crystal layer 22. The light transmitted through the color filters CF on the first substrate 21 has colors corresponding to the colors of the color filters CF. That is, the light transmitted through the second polarizing plate 25 has the colors corresponding to the colors of the color filters CF, and the luminance is adjusted.

In each of the display sub-pixels Sd, the color of the color filter CF, that is, the color of the light transmitted through the second polarizing plate 25, corresponds to the color of the display sub-pixel Sd. In each of the display sub-pixels Sd, the luminance of the light transmitted through the second polarizing plate 25, that is, the transmittance of the display sub-pixel Sd, is adjusted in accordance with the gradation values of the display sub-gradation data. As a result, the image based on the image signal is displayed in the display area DA. The display panel 20 may employ a normally white system.

The dimming panel 30 adjusts the brightness of the light emitted from the light source device 40 and incident on the display panel 20. In other words, the dimming panel 30 adjusts the transmittance in the Z-direction. As illustrated in FIG. 4, the dimming panel 30 is bonded to the display panel 20 with a light-transmitting adhesive layer OCA interposed therebetween. The dimming panel 30 adjusts the brightness of the light by adjusting the transmittance in a dimming area PA illustrated in FIG. 1. Specifically, the dimming panel 30 adjusts the brightness of the light emitted from the light source device 40. The dimming area PA covers the entire display area DA in plan view.

As illustrated in FIG. 1, the dimming panel 30 includes a plurality of dimming sub-pixels Sp arranged in a matrix having a row-column configuration along the X- and Y-directions in the dimming area PA.

The dimming sub-pixels Sp overlap the respective display sub-pixels Sd in plan view, and are configured in the same manner as the display sub-pixels Sd described above, except that the colors of the dimming sub-pixels Sp are the same as one another. That is, the dimming panel 30 includes the switching element SW, the sub-pixel electrode PE, the common electrode CE, the liquid crystal capacitance LC, and the holding capacitance CS that are included in each of the dimming sub-pixels Sp. The dimming sub-pixels Sp are driven by the second signal output circuit 14 and the second scan circuit 15.

The second signal output circuit 14 outputs the dimming sub-pixel signals to the dimming sub-pixels Sp (to be described in detail later). The second signal output circuit 14 is electrically coupled to the dimming sub-pixels Sp through a plurality of second signal lines Lb2 extending along the Y-direction.

The second scan circuit 15 scans the dimming sub-pixels Sp in synchronization with the output of the dimming sub-pixel signals by the second signal output circuit 14. The second scan circuit 15 is electrically coupled to the dimming sub-pixels Sp through a plurality of second scan lines Lc2 extending along the X-direction.

As illustrated in FIG. 4, the dimming panel 30 is configured in the same manner as the display panel 20, except in not including the color filters CF and the overcoat layer OC. That is, the dimming panel 30 includes a third substrate 31, a liquid crystal layer 32, a fourth substrate 33, the orientation films AL, the light-blocking layer SM, a third polarizing plate 34, and a fourth polarizing plate 35 corresponding to the first substrate 21, the liquid crystal layer 22, the second substrate 23, the orientation films AL, the light-blocking layer SM, the first polarizing plate 24, and the second polarizing plate 25, respectively, of the display panel 20. The transmission axes of the first polarizing plate 24 and the fourth polarizing plate 35 are parallel to each other. The display device 1 need not include either one of the first polarizing plate 24 and the fourth polarizing plate 35.

With the dimming panel 30 configured in this manner, the dimming sub-pixels Sp are arranged in a matrix having a row-column configuration along the X- and Y-directions in the dimming area PA as described above, as illustrated in FIG. 1. In the dimming area PA, a plurality of dimming sub-pixel sets CSp, each set including three of the dimming sub-pixels Sp and overlapping one display sub-pixel set CSd in plan view, are arranged along the X- and Y-directions. The plurality of dimming sub-pixel sets CSp overlap the respective pixels G in plan view.

The following describes an operation of the dimming panel 30. The dimming panel 30 is configured in the same manner as the display panel 20, except in not including the color filters CF and the overcoat layer OC as described above, and operates in the same manner as the display panel 20. The light emitted from the light source device 40 is incident on the third polarizing plate 34.

When the dimming panel 30 does not transmit the light (that is, when the transmittance is 0%), the drive circuit does not drive the dimming sub-pixels Sp, and the dimming panel 30 operates in the same manner as in the case where the display panel 20 displays the black color.

In contrast, when the dimming panel 30 transmits the light (that is, when the transmittance exceeds 0%), the dimming sub-pixel signals are output to the dimming sub-pixels Sp through the second signal output circuit 14. The dimming sub-pixel signals contain dimming sub-gradation data indicating the gradations of the dimming sub-pixels Sp, as will be described later.

The second scan circuit 15 scans the dimming sub-pixels Sp to operate the dimming sub-pixels Sp in the same manner as the display sub-pixels Sd described above. That is, the direction of the polarizing axis of the light transmitted through the liquid crystal layer 32 changes in accordance with the gradation values of the dimming sub-gradation data. In this manner, the dimming sub-pixel signals adjust the orientation of the liquid crystal molecules, and thereby, adjusting the transmittance of the liquid crystal layer 32 and thus the luminance of the light transmitted through the liquid crystal layer 32. That is, the transmittance of the dimming panel 30 is adjusted. The light transmitted through the dimming panel 30 is incident on the display panel 20.

The light source device 40 is disposed on a back surface side of the dimming panel 30 as illustrated in FIGS. 2 and 4, and emits light toward the dimming panel 30 and the display panel 20. The light source device 40 emits the light from an emission area SA illustrated in FIG. 1. The emission area SA overlaps the dimming area PA and the display area DA in plan view.

Figure 6:
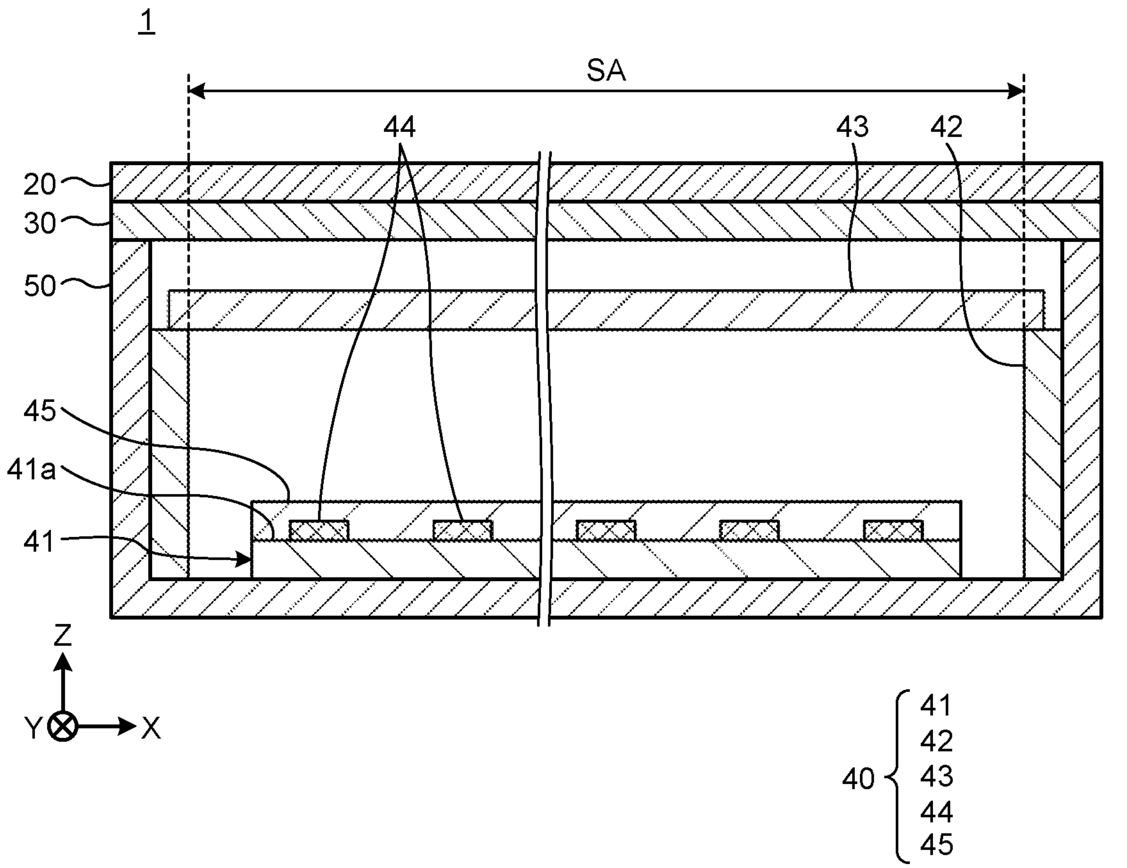
FIG. 6 is a sectional view of the display device.

FIG. 6 is a sectional view of the display device 1. The display device 1 is open on the +Z side and further includes a housing 50 that supports, at the periphery thereof, the display panel 20 and the dimming panel 30.

The light source device 40 is disposed in the housing 50. The light source device 40 is a direct-type backlight unit. The light source device 40 includes an electric circuit board 41, a frame 42, and a diffusion panel 43.

The electric circuit board 41 is rectangular in plan view and is located on an inside bottom surface of the housing 50. A plurality of light-emitting elements 44 are mounted on a principal surface 41*a* of the electric circuit board 41 that overlaps the emission area SA in plan view, and the light-emitting elements 44 are covered with an overcoat layer 45 that protects the light-emitting elements 44.

The light-emitting elements 44 are self-luminous elements such as light-emitting diodes (LEDs). The light-emitting elements 44 are arranged in a grid in plan view. Specifically, the light-emitting elements 44 are arranged in a matrix having a row-column configuration along the X- and Y-directions at a location closer to the center of the principal surface 41*a* than the periphery thereof in plan view.

The light-emitting elements 44 are evenly arranged over the entire principal surface 41*a*. That is, the number of the light-emitting elements 44 arranged per unit area of the principal surface 41*a* is the same over the entire principal surface 41*a*. Specifically, the light-emitting elements 44 are arranged at even intervals along the X- and Y-directions. The light-emitting elements 44 emit light toward the +Z side.

Inside the housing 50, the frame 42 supports the periphery of the diffusion panel 43 on the +Z side of the electric circuit board 41. The frame 42 is disposed on an inner surface of a side wall of the housing 50 and disposed on a more lateral side than the electric circuit board 41. That is, in plan view, the periphery of the electric circuit board 41 is away from the side walls of the housing and the frame 42. In plan view, the electric circuit board 41 may have a shape in contact with the side walls of the housing 50 or the frame 42, but the light-emitting elements 44 are arranged on the principal surface 41*a* away from the side walls of the housing 50 and the frame 42.

The diffusion panel 43 transmits the light emitted from the light-emitting elements 44 while diffusing it. A portion of a front surface of the diffusion panel 43 closer to the center than a portion of a front surface of the diffusion panel 43 supported by the housing 50 corresponds to the emission area SA.

The light source control circuit 16 controls the light-emitting elements 44 based on the light source control signals so as to equalize the amounts of light of the light-emitting elements 44 to one another. This control equalizes the luminance of the light-emitting elements 44, that is, the brightness of the light emitted by the light-emitting elements 44. The light emitted from the light-emitting elements 44 is emitted as emission light from the emission area SA toward the back surface of the dimming panel 30.

Figure 7:
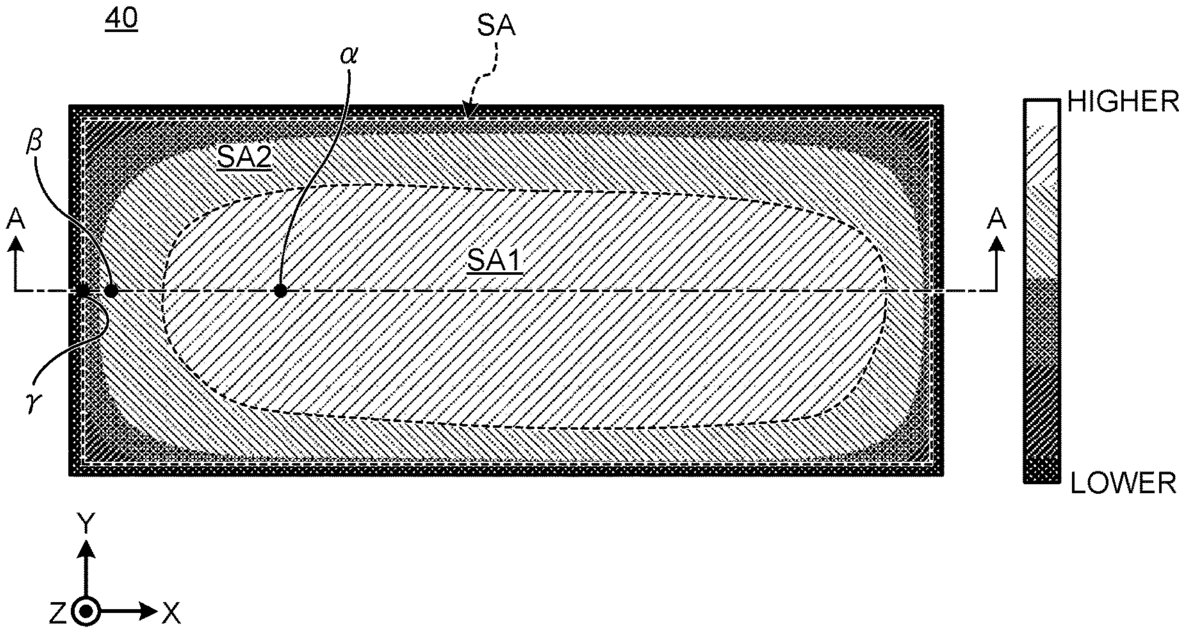
FIG. 7 is a diagram illustrating a luminance distribution of an emission area in plan view.

FIG. 7 is a diagram illustrating a luminance distribution of the emission area SA in plan view. FIG. 7 illustrates the luminance distribution of the emission area SA when the luminance values of the light-emitting elements 44 are equal to one another.

The emission area SA has a first emission area SA1 and a second emission area SA2. The brightness of the emission light in the second emission area SA2 is lower than that of the emission light in the first emission area SA1. That is, the luminance of the second emission area SA2 is lower than that of the first emission area SA1.

The first emission area SA1 is located in a central portion of the emission area SA in plan view. The reason for this is that, as described above, a plurality of light-emitting elements 44, which have the same amounts of light as each other, are arranged in a matrix having a row-column configuration at equal intervals along the X- and Y-directions, so that the luminance is substantially constant at the highest value in the central portion of the emission area SA in plan view.

The second emission area SA2 is located closer to the peripheral side of the emission area SA than the first emission area SA1 is in plan view. Specifically, the second emission area SA2 is adjacent to the first emission area SA1 and is located between the periphery of the first emission area SA1 and the periphery of the emission area SA. In the second emission area SA2, the luminance decreases from the central side toward the peripheral side of the emission area SA.

The reason for this is that, the periphery of the electric circuit board 41 is away from the side walls of the housing 50 and the frame 42 in plan view as described above, and the number of the light-emitting elements 44 per unit area in an area corresponding to the second emission area SA2 is smaller than the number of the light-emitting elements 44 per unit area in an area corresponding to the first emission area SA1. It is further because, in the second emission area SA2, the light-emitting elements 44 are located on the central side of the emission area SA, and the amounts of light of the light-emitting elements 44 decrease from the central side toward the peripheral side of the emission area SA.

Figure 8:
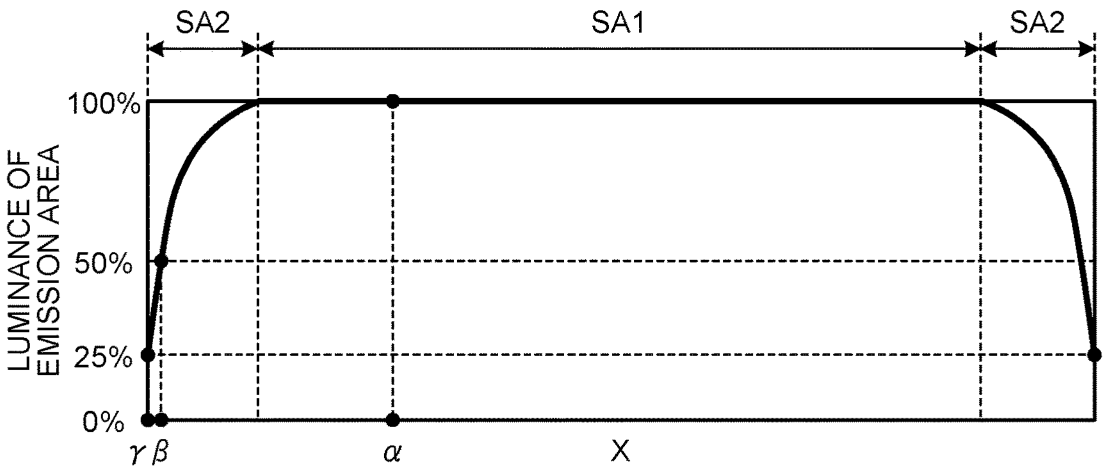
FIG. 8 is a diagram illustrating the luminance distribution of the emission area in a section of a light source device along line A-A illustrated in FIG. 7.

FIG. 8 is a diagram illustrating the luminance distribution of the emission area SA in a section of the light source device 40 along line A-A illustrated in FIG. 7. In FIG. 8, the horizontal axis represents the X-coordinate of the emission area SA, and the vertical axis represents the luminance of the emission area SA as a percentage with the highest luminance in the emission area SA being defined as 100%.

As illustrated in FIG. 8, in the first emission area SA1, the luminance is substantially constant at the highest value (that is, 100%) in the emission area SA. The luminance continuously changes from the first emission area SA1 to the second emission area SA2. The luminance of the second emission area SA2 is lower than 100% at the inner periphery thereof and decreases from the central side toward the peripheral side of the emission area SA, and the luminance at the outer periphery of the second emission area SA2 is 25%.

Also, in a section of the light source device 40 along a straight line intersecting line A-A in plan view, the luminance is substantially constant at the highest value in the first emission area SA1 and decreases from the central side toward the peripheral side of the emission area SA in the second emission area SA2.

Figure 9:
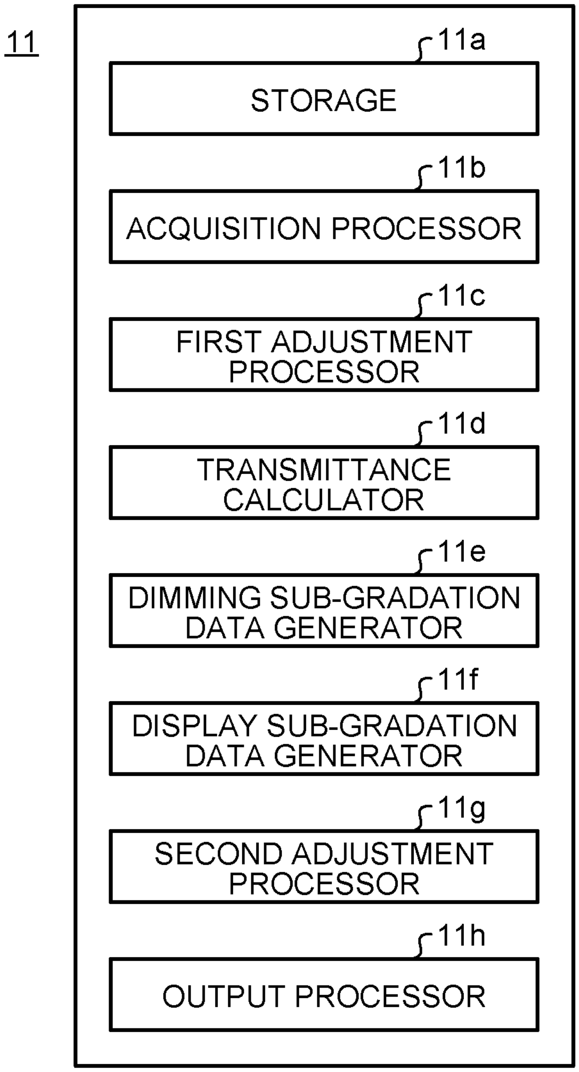
FIG. 9 is a block diagram of a signal processing circuit.

The following describes a configuration of the signal processing circuit 11. FIG. 9 is a block diagram of the signal processing circuit 11. The signal processing circuit 11 includes a storage 11*a*, an acquisition processor 11*b*, a first adjustment processor 11*c*, a transmittance calculator 11*d*, a dimming sub-gradation data generator 11*e*, a display sub-gradation data generator 11*f*, a second adjustment processor 11*g*, and an output processor 11*h*.

The storage 11*a* preliminarily stores therein luminance adjustment data for adjusting the luminance. As described above, the luminance of the second emission area SA2 is lower than that of the first emission area SA1 in the emission area SA. Therefore, when the gradation values of the gradation data in the pixels G are equal to one another, the luminance of an area of the display area DA corresponding to the second emission area SA2 is lower than that of an area of the display area DA corresponding to the first emission area SA1, and thus, a desired level of the luminance cannot be obtained.

Therefore, as will be described below, the luminance adjustment data is defined so as to uniformize the luminance of the display area DA when the gradation values of the gradation data for the pixels G are equal to one another correspondingly to the luminance distribution of the emission area SA illustrated in FIGS. 7 and 8.

Specifically, the drive circuit 10 adjusts the transmittance of the dimming area PA using the luminance adjustment data. The drive circuit 10 adjusts the transmittance of the dimming area PA according to the luminance adjustment data so that, when the gradation values of the pixel G corresponding to the first emission area SA1 (hereinafter, called "first pixel") among the pixels G are equal to the gradation values of the pixel G corresponding to the second emission area SA2 (hereinafter, called "second pixel") among the pixels, the transmittance of a second dimming area PA2 corresponding to the second pixel is higher than the transmittance of a first dimming area PA1 corresponding to the first pixel in the dimming area PA.

A plurality of the first pixels are the pixels G that overlap the first emission area SA1 in plan view among the pixels G in the display area DA. A plurality of the second pixels are the pixels G that overlap the second emission area SA2 in plan view among the pixels G in the display area DA.

The first dimming area PA1 is an area of the dimming area PA that overlaps the first emission area SA1 in plan view and is located in a central portion of the dimming area PA. Thus, the first pixels overlap the first dimming area PA1 and the first emission area SA1 in plan view.

The second dimming area PA2 is an area of the dimming area PA that overlaps the second emission area SA2 in plan view and is located closer to the peripheral side of the dimming area PA than the first dimming area PA1 is in plan view. Specifically, the second dimming area PA2 is located between the periphery of the first dimming area PA1 and the periphery of the dimming area PA. Thus, the second pixels overlap the second dimming area PA2 and the second emission area SA2 in plan view.

In the luminance adjustment data, the adjustment degree for the first dimming area PA1 corresponding to the first emission area SA1 is constant and lower than the adjustment degree for the second dimming area PA2 corresponding to the second emission area SA2. The adjustment degree of for the second dimming area PA2 is such that the luminance increases from the central side toward the peripheral side of the dimming area PA.

Figure 10:
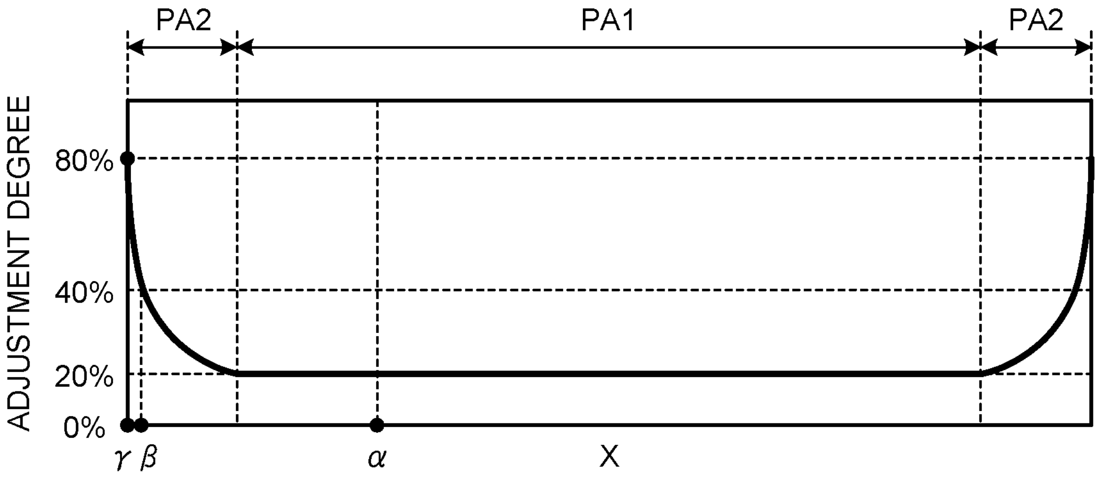
FIG. 10 is a diagram illustrating a part of luminance adjustment data.

FIG. 10 is a diagram illustrating a part of the luminance adjustment data. The luminance adjustment data in FIG. 10 illustrates a relation between the position of the dimming sub-pixel Sp in the section of the dimming panel 30 along line A-A illustrated in FIG. 7 and the adjustment degree, where the horizontal axis represents the X-coordinate of the dimming area PA and the vertical axis represents the adjustment degree (%).

The luminance adjustment data represents a curved shape approximating the shape of a curve of the luminance distribution of the emission area SA illustrated in FIG. 8 to a symmetrical shape with a straight line parallel to the horizontal axis as an axis of symmetry. Specifically, the adjustment degree for the first dimming area PA1 is constant at 20%. The adjustment degree continuously changes from the first dimming area PA1 to the second dimming area PA2. The adjustment degree exceeds 20% at the inner periphery of the second dimming area PA2 and increases from the central side toward the peripheral side of the dimming area PA, and the adjustment degree at the outer periphery of the second dimming area PA2 is 80%.

The luminance adjustment data is individually determined on a display device 1 basis. Specifically, the luminance of the emission area SA is measured on a display device 1 basis at the time of manufacture of the display device 1, and the luminance adjustment data is determined correspondingly to the measured emission area SA and stored in the storage 11*a*. That is, the luminance adjustment data is determined on a display device 1 basis, correspondingly to individual differences of the light source device 40. The luminance adjustment data may be determined correspondingly to the luminance of the emission area SA that is measured in advance by experiments or the like before manufacturing the display device 1, and may be stored in the storage 11*a*. In this case, the luminance adjustment data is determined regardless of the individual differences of the light source device 40, and the same luminance adjustment data is stored in each of the storages 11*a* of a plurality of the display devices 1.

The acquisition processor 11*b* acquires the image signal corresponding to the pixels G. The image signal includes the gradation data indicating the gradations of the pixels G. A plurality of pieces of the gradation data are provided so as to correspond to the first display sub-pixels Sd1, the second display sub-pixels Sd2, and the third display sub-pixels Sd3 constituting the pixels G.

The gradation data includes first gradation data corresponding to the first display sub-pixels Sd1, second gradation data corresponding to the second display sub-pixels Sd2, and third gradation data corresponding to the third display sub-pixels Sd3. The first, the second, and the third gradation data may simply be called "gradation data" when being described without being distinguished from one another. The gradation data has what are called gamma characteristics.

The first adjustment processor 11*c* linearizes each of the pieces of the gradation data acquired by the acquisition processor lib. Specifically, the first adjustment processor 11*c* applies linearization coefficients to the gradation values of the gradation data to converts the gradation data having the gamma characteristics to linear gradation data. These linearization coefficients are stored in advance in the storage 11*a*.

The transmittance calculator 11*d* calculates the transmittance (%) of the dimming panel 30. First, the transmittance calculator 11*d* identifies a highest gradation value for each of the pixels G. The highest gradation value is a gradation value in the linearized gradation data that is highest of the three pieces of gradation data for one pixel G.

The transmittance calculator 11*d* also calculates a gradation ratio for each of the pixels G. The gradation ratio is the ratio of the highest gradation value to the maximum gradation value. For example, when the gradation data is 8-bit data and the gradation values are expressed as values from 0 to 255, the maximum gradation value is 255 and the gradation ratio is a value obtained by dividing the highest gradation value by 255.

Furthermore, the transmittance calculator 11*d* multiplies the adjustment degree for an area of the dimming area PA corresponding to the pixel G (that is, one of the first dimming area PA1 and the second dimming area PA2) by the gradation ratio, for each of the pixels G. The transmittance calculator 11*d* determines the result of the calculation as the transmittance of the area of the dimming area PA that overlaps the pixel G in plan view. That is, the transmittance of the dimming panel 30 is calculated for each area of the dimming area PA overlapping one pixel G in plan view, that is, for each of the dimming sub-pixel sets CSp (three dimming sub-pixels Sp).

The dimming sub-gradation data generator 11*e* generates the dimming sub-gradation data indicating the gradation value of the dimming sub-pixel Sp, for each of the dimming sub-pixels Sp. Specifically, the dimming sub-gradation data generator 11*e* generates, as the dimming sub-gradation data for each of the dimming sub-pixels Sp, data indicating a value obtained by multiplying the transmittance in the area of the dimming area PA where the dimming sub-pixel Sp is located by the highest gradation value of the pixel G corresponding to the dimming sub-pixel Sp. Thus, the gradation values of the three dimming sub-pixels Sp that constitute one dimming sub-pixel set CSp corresponding to one pixel G are equal to one another.

The display sub-gradation data generator 11*f* generates, for each of the display sub-pixels Sd, the display sub-gradation data indicating the gradation value of the display sub-pixel Sd. Specifically, the display sub-gradation data generator 11*f* generates first display sub-gradation data corresponding to the first display sub-pixel Sd1, second display sub-gradation data corresponding to the second display sub-pixel Sd2, and third display sub-gradation data corresponding to the third display sub-pixel Sd3.

More specifically, the display sub-gradation data generator 11*f* generates data indicating a value obtained by multiplying the gradation value of the first gradation data of the pixel G corresponding to the first display sub-pixel Sd1 by the reciprocal of the gradation ratio of the pixel G, as the first display sub-gradation data for each of the first display sub-pixels Sd1.

In the same manner, the display sub-gradation data generator 11*f* generates data indicating a value obtained by multiplying the gradation value of the second gradation data of the pixel G corresponding to the second display sub-pixel Sd2 by the reciprocal of the gradation ratio of the pixel G, as the second display sub-gradation data for each of the second display sub-pixels Sd2. Furthermore, the display sub-gradation data generator 11*f* generates data indicating a value obtained by multiplying the gradation value of the third gradation data of the pixel G corresponding to the third display sub-pixel Sd3 by the reciprocal of the gradation ratio of the pixel G, as the third display sub-gradation data for each of the third display sub-pixels Sd3. When describing matters common to the first, the second, and the third display sub-gradation data without distinguishing them from one another, they may simply be called "display sub-gradation data".

The second adjustment processor 11*g* applies gamma correction to the dimming sub-gradation data generated by the dimming sub-gradation data generator 11*e* and the display sub-gradation data generated by the display sub-gradation data generator 11*f*. Specifically, the second adjustment processor 11*g* converts the dimming sub-gradation data and the display sub-gradation data that have linearity to the dimming sub-gradation data and the display sub-gradation data that have gamma characteristics by applying gamma values to the respective gradation values of the dimming sub-gradation data and the display sub-gradation data. The gamma values are stored in advance in the storage 11*a*.

The output processor 11*h* generates the display sub-pixel signals containing the display sub-gradation data having the gamma correction applied thereto and outputs the generated data to the first signal output circuit 12. The output processor 11*h* generates the dimming sub-pixel signals containing the dimming sub-gradation data having the gamma correction applied thereto and outputs the generated data to the second signal output circuit 14.

Figure 11:
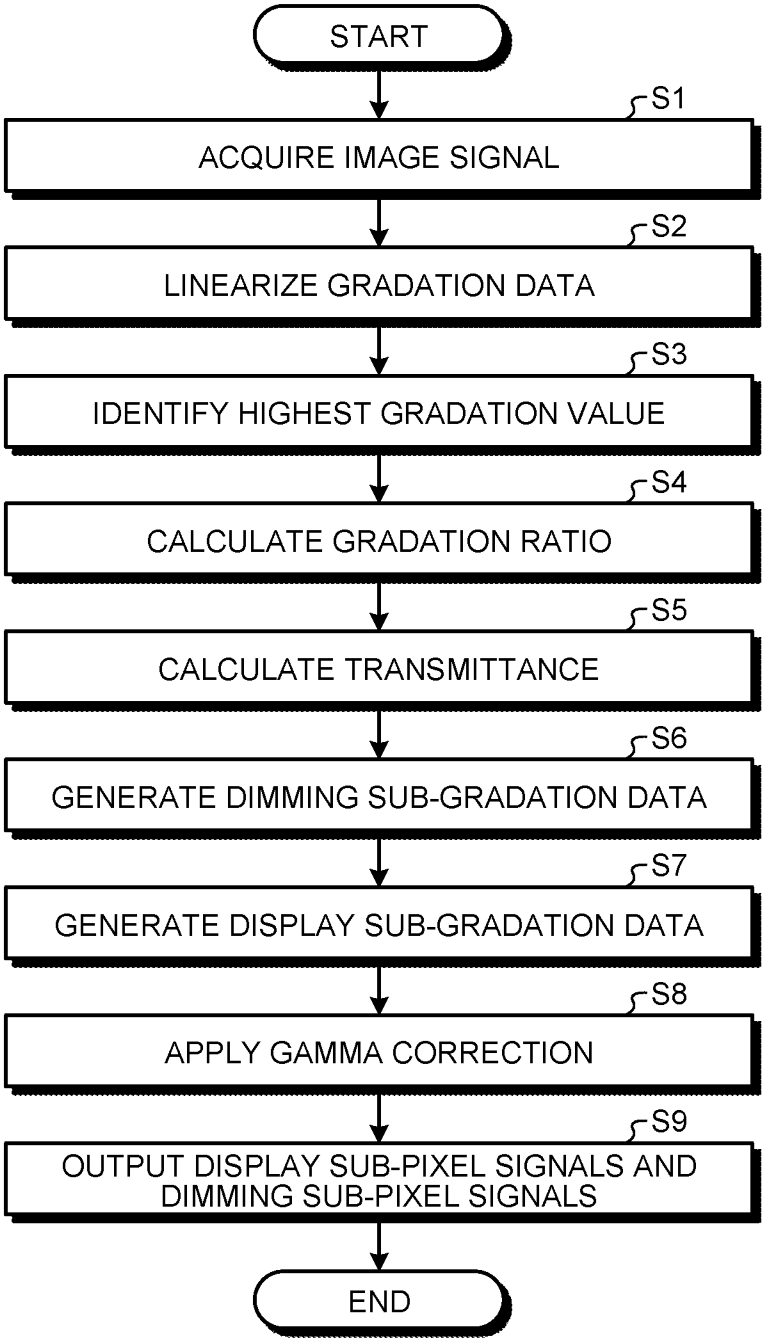
FIG. 11 is a flowchart of a process executed by a drive circuit.

The following describes operations of the drive circuit 10, the display panel 20, and the dimming panel 30, using FIGS. 11 and 12. FIG. 11 is a flowchart of a process executed by the drive circuit 10. FIG. 12 is a table illustrating, for example, values calculated by the drive circuit 10 when generating the dimming sub-gradation data and the display sub-gradation data.

The following describes a case where the light source device 40 is controlled as described above so that the luminance distribution of the emission area SA is brought into the state illustrated in FIGS. 7 and 8, where the gradation values of the gradation data in the pixels G are equal to one another and a white color is displayed in the entire display area DA.

The following specifically describes a process of calculating the respective gradation values of the display sub-pixels Sd and the dimming sub-pixels Sp corresponding to the pixels G located at points α, β and γ illustrated in FIGS. 7 and 8 in the case where the gradation data, the display sub-gradation data, and the dimming sub-gradation data are 8-bit data.

As illustrated in FIGS. 7 and 8, the pixel G corresponding to the point α corresponds to the first pixel located in the first emission area SA1, and the pixels G corresponding to the points β and γ correspond to the second pixels located in the second emission area SA2. As illustrated in FIG. 10, the dimming sub-pixel Sp corresponding to the point α is located in the first dimming area PA1, and the dimming sub-pixels Sp located at the points β and γ are located in the second dimming area PA2.

As illustrated in FIGS. 8 and 12, the luminance values (A) of the emission area SA are 100%, 50%, and 25% at the points α, β, and γ, respectively. As illustrated in FIGS. and 12, the adjustment degrees (B) are 20%, 40%, and 80% at the points α, β, and γ, respectively.

As illustrated in FIG. 11, the acquisition processor 11*b* acquires the image signal at Step S1. When the white color is displayed in the entire display area DA, the gradation data of all the pixels G indicates 255 that is the maximum gradation value, and three pieces of the gradation data of the pixels G located at the respective points α, β, and γ have a gradation value of 255. The first adjustment processor 11*c* then linearizes the gradation data at Step S2.

Furthermore, the transmittance calculator 11*d* identifies the highest gradation value at Step S3. Since the gradation value of each of the three pieces of the gradation data of the pixels G located at the points α, and γ is 255 as described above, the highest gradation value (C) of each of the pixels G located at the points α, and γ is "255" (FIG. 12).

The transmittance calculator 11*d* then calculates the gradation ratio (=highest gradation value (C)/255) at Step S4. The gradation ratio (D) of the pixel G located at each of the points α, β, and γ is "1" (FIG. 12).

Furthermore, the transmittance calculator 11*d* calculates the transmittance (=adjustment degree (B)×gradation ratio (D)) at Step S5. The transmittance of the dimming sub-pixels Sp corresponding to the points α, and γ is "20%", "40%", and "80%", respectively (FIG. 12).

The dimming sub-gradation data generator 11*e* then generates the dimming sub-gradation data including the gradation values of the dimming sub-pixels Sp (=highest gradation value (C)×transmittance (E)) at Step S6. The gradation values (F) of the dimming sub-pixels Sp corresponding to the points α, β, and γ are "25", "51", and "204", respectively.

Furthermore, the display sub-gradation data generator 11*f* generates the display sub-gradation data including the gradation values of the display sub-pixels Sd (=highest gradation value (C)×(1/gradation ratio (D)) at Step S7. The gradation values (G) of the display sub-pixels Sd corresponding to the points α, β, and γ are "255", "255", and "255", respectively.

The second adjustment processor 11*g* then applies the gamma correction to the dimming sub-gradation data and the display sub-gradation data at Step S8. The output processor 11*h* outputs the display sub-pixel signals containing the display sub-gradation data to the first signal output circuit 12 and outputs the dimming sub-pixel signals containing the dimming sub-gradation data to the second signal output circuit 14, at Step S9.

As described above, the second signal output circuit 14 transmits the dimming sub-pixel signals to the corresponding dimming sub-pixels Sp, and the dimming sub-pixels Sp operate to adjust the transmittance on a dimming sub-pixel set CSp basis in the dimming area PA.

Specifically, the transmittance of the one dimming sub-pixel set CSp corresponding to the pixel G located at the point α is adjusted to 20%; the transmittance of the one dimming sub-pixel set CSp corresponding to the pixel G located at the point β is adjusted to 40%; and the transmittance of the one dimming sub-pixel set CSp corresponding to the pixel G located at the point γ is adjusted to 80%. The transmittance of the first dimming area PA1 of the dimming area PA including the pixel G located at the point α is constant at 20%, and continuously changes from the first dimming area PA1 toward the second dimming area PA2, and the transmittance of the second dimming area PA2 including the pixels G located at the points β and γ exceeds 20% and increases to 80% from the central side toward the periphery of the dimming area PA.

As described above, the first signal output circuit 12 transmits the display sub-pixel signals to the corresponding display sub-pixels Sd. The display sub-pixels Sd operate to display an image (image that is entirely white) in the display area DA. At this time, the brightness of the image displayed in the display area DA (that is, the luminance of the display area DA) is determined by the luminance of the emission area SA, the transmittance of the dimming panel 30, and the transmittance of the display panel 20. Specifically, the luminance of the display area DA, when expressed in gradation value, can be calculated by multiplying together the luminance of the emission area SA (A) illustrated in FIG. 12, the transmittance (E), and the gradation value of the display sub-pixel Sd (G) included in the pixel G.

The luminance of the display area DA at the pixel G located at the point α (H (=luminance of emission area SA (A)×transmittance (E)×gradation value of display sub-pixel Sd (G)) is "51". The luminance (H) of the display area DA at the pixel G located at the point β is "51". The luminance (H) of the display area DA at the pixel G located at the point γ is "51". Thus, when the gradation values of the gradation data at the pixels G are equal to one another, the luminance values of the display area DA at the pixels G located at the points α, β, and γ are equal to one another.

Figure 13:
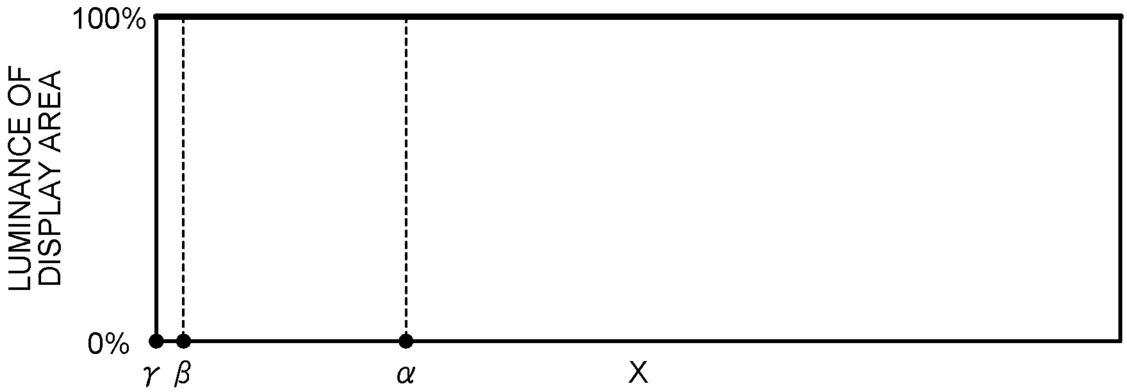
FIG. 13 is a diagram illustrating a part of luminance of the display area when gradation values of gradation data of a plurality of pixels are equal to one another.

FIG. 13 is a diagram illustrating a part of the luminance of the display area DA when the gradation values of the gradation data of the pixels G are equal to one another. The luminance of the display area DA in FIG. 13 illustrates a relation between the position and the luminance of the display sub-pixel Sd in the-section of the display panel 20 along line A-A illustrated in FIG. 7, where the horizontal axis represents the X-coordinate of the display area DA and the vertical axis represents the luminance of the display area DA as a percentage with the highest luminance in the display area DA being defined as 100%.

As illustrated in FIG. 13, the luminance of the display area DA is constant over the entire X-direction. In plan view, in the same manner as in FIG. 13, the luminance is substantially constant in the area of the display area DA corresponding to the first dimming area PA1 and the second dimming area PA2 of the dimming area PA (that is, the entire display area DA).

As described above, by adjusting the gradation values of the dimming panel 30 and the display panel 20 using the luminance adjustment data, the luminance of the display area DA can be uniformized even when the luminance of the emission area SA is not uniform. That is, when the gradation values of the pixels G are the same as one another, the brightness of the display area DA displaying the image can be uniformized.

When the luminance adjustment data is not used, the luminance of the display area DA is calculated by multiplying the luminance of the emission area SA (A) by the gradation value of the display sub-gradation data (255 when the white color is displayed in the entire display area DA) when the transmittance of the entire dimming area PA is constant at 100%, for example.

Specifically, as illustrated in FIG. 12, when the gradation values of the gradation data in the pixels G are equal to one another and the white color is displayed in the entire display area DA, the luminance values of the display area DA at the pixels G located at the points α, and γ (X (=luminance of emission area SA (A)×255) are "255", "127", and "64". Thus, when the luminance adjustment data is not used, the luminance of the display area DA corresponds to that of the emission area SA, and, when the white color is displayed in the entire display area DA, the luminance of the periphery of the display area DA is lower than that of a central portion of the display area DA.

Modification of First Embodiment

The following describes the display device 1 according to a modification and mainly describes differences of the display device 1 according to the modification of the first embodiment from that according to the first embodiment described above.

In the present modification, the luminance adjustment data is determined so as to set the luminance of the periphery of the display area DA slightly lower than that of the central portion of the display area DA.

Specifically, at the outer periphery of the second dimming area PA2, the adjustment degree of the present modification is set lower than the adjustment degree of the first embodiment described above (80%) illustrated in FIG. 10 (for example, to 65%). Thus, the adjustment degrees (B) at the points α, β, and γ are set to, for example, 20%, 35%, and 65%, respectively. As a result, when the gradation values of the gradation data in the pixels G are equal to one another and the white color is displayed in the entire display area DA, the luminance values (H) of the display area DA are "51", "45" and "41" at the points α, β, and γ, respectively.

Figure 14:
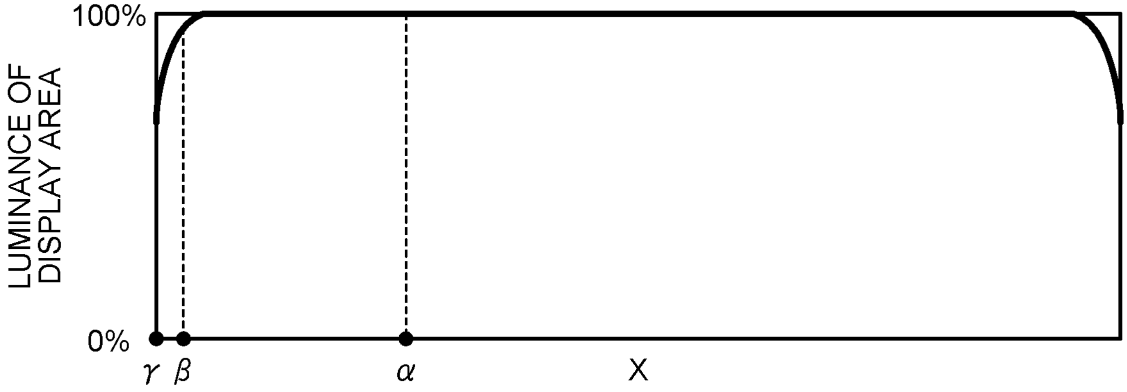
FIG. 14 is a diagram illustrating a part of the luminance of the display area when the gradation values of the gradation data of the pixels are equal to one another in a modification of the first embodiment.

FIG. 14 is a diagram illustrating a part of the luminance of the display area DA when the gradation values of the gradation data of the pixels G are equal to one another in the modification of the first embodiment. The luminance of the display area DA in FIG. 14 illustrates the relation between the position and the luminance of the display sub-pixel Sd in the-section of the display panel 20 along line A-A illustrated in FIG. 7, in the same manner as in FIG. 13.

As illustrated in FIG. 14, the luminance of both ends of the display area DA in the X-direction is lower than that of the central portion thereof. In the same manner, in plan view of the display area DA, the luminance of the periphery is lower than that of the central portion. Also in this case, the brightness of the display area DA is more uniform than that when the luminance adjustment data is not used.

Second Embodiment

The following describes the display device 1 according to a second embodiment of the present disclosure, and mainly describes differences of the display device 1 according to the second embodiment from that according to the first embodiment described above. In the second embodiment, the luminance distribution and the luminance adjustment data of the emission area SA differ from those of the first embodiment described above.

In the second embodiment, the second emission area SA2 is located in the central portion of the emission area SA in plan view. The luminance of the emission area SA is substantially constant in the second emission area SA2.

The first emission area SA1 is located closer to the peripheral side of the emission area SA than the second emission area SA2 is in plan view. Specifically, the first emission area SA1 is adjacent to the second emission area SA2 and is located between the periphery of the second emission area SA2 and the periphery of the emission area SA. The luminance continuously changes from the second emission area SA2 to the first emission area SA1. In the first emission area SA1, the luminance increases from the central side toward the peripheral side of the emission area SA and then decreases.

Figure 15:
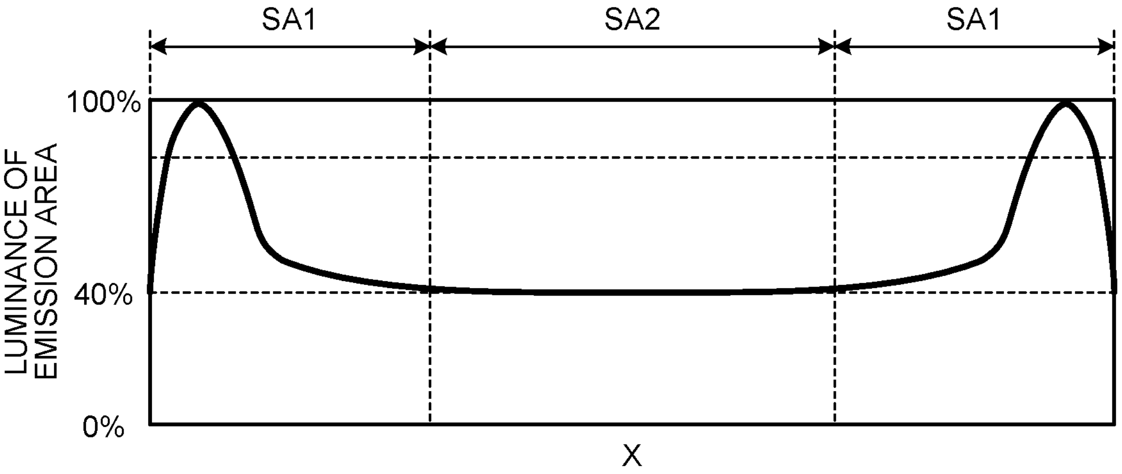
FIG. 15 is a diagram illustrating the luminance distribution of the emission area in the section of the light source device along line A-A illustrated in FIG. 7 in a second embodiment of the present disclosure.

FIG. 15 is a diagram illustrating the luminance distribution of the emission area SA in the section of the light source device 40 along line A-A illustrated in FIG. 7 in the second embodiment. As illustrated in FIG. 15, in the second emission area SA2, the luminance is substantially constant at lower luminance than (for example, at 40%) that of the first emission area SA1.

The luminance of the first emission area SA1 exceeds, for example, 40% at the inner periphery thereof, increases toward the outer periphery of the first emission area SA1 to, for example, 100%, and then decreases toward the periphery of the emission area SA.

The light source control circuit 16 controls the amounts of light of the light-emitting elements 44 so as to achieve such a luminance distribution of the emission area SA. Specifically, the light source control circuit 16 makes the amounts of light of the light-emitting elements 44 that overlap the second emission area SA2 in plan view smaller than those of the light-emitting elements 44 that overlap the first emission area SA1 in plan view. This control makes the brightness of the light-emitting elements 44 that correspond to the second emission area SA2 lower than that of the light-emitting elements 44 that correspond to the first emission area SA1.

Furthermore, the light source control circuit 16 increases the amounts of light of the light-emitting elements 44 that overlap the first emission area SA1 in plan view from the inner periphery toward the outer periphery of the first emission area SA1, and then reduces the amounts of light thereof.

The luminance adjustment data of the second embodiment is defined so as to uniformize the luminance of the display area DA when the gradation values of the gradation data in the pixels G are equal to one another correspondingly to the luminance distribution of the emission area SA of the second embodiment described above. In the luminance adjustment data, the adjustment degree for the second dimming area PA2 corresponding to the second emission area SA2 is constant and higher than the adjustment degree for the first dimming area PA1 corresponding to the first emission area SA1. The adjustment degree continuously changes from the second dimming area PA2 to the first dimming area PA1. The adjustment degree of the luminance for the first dimming area PA1 decreases and then increases from the central side toward the peripheral side of the dimming area PA.

Figure 16:
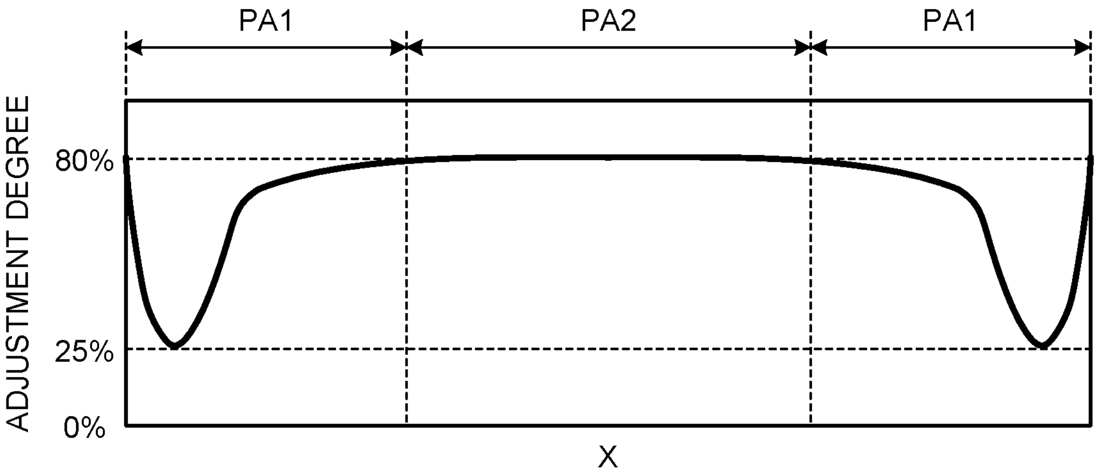
FIG. 16 is a diagram illustrating a part of the luminance adjustment data of the second embodiment.

FIG. 16 is a diagram illustrating a part of the luminance adjustment data of the second embodiment. The luminance adjustment data in FIG. 16 illustrates a relation between the position of the dimming sub-pixel Sp (in other words, the X-coordinate of the dimming area PA) and the adjustment degree in the section of the dimming panel 30 along line A-A illustrated in FIG. 7.

The luminance adjustment data represents a curved shape approximating the shape of a curve of the luminance distribution of the emission area SA illustrated in FIG. 15 to a symmetrical shape with a straight line parallel to the horizontal axis as an axis of symmetry. Specifically, the adjustment degree for the second dimming area PA2 is constant at, for example, 80%. The adjustment degree at the inner periphery of the first dimming area PA1 is lower than 80%, for example, and the adjustment degree decreases from the central side toward the peripheral side of the dimming area PA to, for example, 25%, and then increases toward the periphery of the emission area SA.

Although the preferred embodiments of the present disclosure have been described above, the present disclosure is not limited to the embodiments described above. The content disclosed in the embodiments is merely an example, and can be variously modified within the scope not departing from the gist of the present disclosure. Any modifications appropriately made within the scope not departing from the gist of the present disclosure also naturally belong to the technical scope of the present disclosure.

For example, in each of the embodiments described above, the arrangement of the light-emitting elements 44 may be changed so as to achieve the luminance distribution of the emission area SA illustrated in any of FIGS. 7, 8, and 15. Specifically, the number of the light-emitting elements 44 arranged per unit area is made larger in an area where the luminance of the emission area SA is higher. That is, the number of the light-emitting elements 44 arranged per unit area in an area of the principal surface 41*a* that overlaps the first emission area SA1 in plan view is made larger than the number of the light-emitting elements 44 arranged per unit area in an area of the principal surface 41*a* that overlaps the second dimming area PA2 in plan view.

The highest gradation value is identified from the three pieces of the gradation data corresponding to one of the pixels G, but may be identified from gradation data corresponding to one set of pixels constituted by a plurality of the pixels G adjacent to one another. In this case, the transmittance of the dimming panel 30 is calculated for an area of the dimming area PA that overlaps the one set of pixels in plan view, that is, for each of the dimming sub-pixel sets CSp.

It is needless to say that the luminance of the emission area SA and the adjustment degree of the luminance adjustment data are not limited to the values described above, and it is also needless to say that the first and the second emission areas SA1 and SA2 and the first and the second dimming areas PA1 and PA2 are not limited to the areas described above. For example, in the luminance distribution of the emission area SA illustrated in FIG. the second emission area SA2 may be located closer to the peripheral side of the emission area SA than the first emission area SA1 is.

The display panel 20 described above may be a vertical electric field liquid crystal display in which the common electrode CE is disposed on the second substrate 23 so as to face the sub-pixel electrodes PE. The display panel 20 may also be a reflective liquid crystal display.

The light source device 40 may be an edge-type backlight unit in which the light-emitting elements 44 are arranged on inner surfaces of the frame 42.

The brightness of the emission light in the second emission area SA2 may be equal to or higher than that of the emission light in the first emission area SA1.

Other operational advantages accruing from the aspects described in the embodiments herein that are obvious from the description herein or that are appropriately conceivable by those skilled in the art will naturally be understood as accruing from the present disclosure.

What is claimed is:

1. A display device comprising:

a display panel having a display area comprising a plurality of pixels;

a light source device configured to emit light from an emission area overlapping the display area in plan view toward the display panel;

a dimming panel disposed between the display panel and the light source device and configured to adjust brightness of emission light emitted from the emission area, in a dimming area overlapping the display area in plan view; and a drive circuit configured to drive the dimming panel, wherein the emission area has a first emission area and a second emission area, and the drive circuit is configured to, when gradation values of first pixels corresponding to the first emission area among the pixels are equal to gradation values of second pixels corresponding to the second emission area among the pixels, make transmittance of a second dimming area corresponding to the second pixels higher than that of a first dimming area corresponding to the first pixels in the dimming area.

2. The display device according to claim 1, wherein the first emission area is located in a central portion of the emission area in plan view, and the second emission area is located closer to a peripheral side of the emission area than the first emission area is in plan view.

3. The display device according to claim 1, wherein the second emission area is located in a central portion of the emission area in plan view, and the first emission area is located closer to a peripheral side of the emission area than the second emission area is in plan view.

4. The display device according to claim 1, wherein the brightness of the emission light in the second emission area is lower than that of the emission light in the first emission area.

5. The display device according to claim 1, wherein the light source device comprises an electric circuit board having a principal surface that overlaps the emission area in plan view, and on which a plurality of light-emitting elements are arranged, and brightness levels of the light-emitting elements are equal to one another.

6. The display device according to claim 1, wherein the light source device comprises an electric circuit board having a principal surface that overlaps the emission area in plan view, and on which a plurality of light-emitting elements are arranged, and among the light-emitting elements, the light-emitting elements corresponding to the second emission area have lower brightness than that of the light-emitting elements corresponding to the first emission area.

* * * * *